US012611981B2

(12) United States Patent
Weidler et al.

(10) Patent No.: US 12,611,981 B2
(45) Date of Patent: Apr. 28, 2026

(54) SAFETY SYSTEM FOR AN AUTONOMOUS VEHICLE, AND METHOD FOR OPERATING A SAFETY SYSTEM OF AN AUTONOMOUS VEHICLE

(71) Applicant: Daimler Truck AG, Leinfelden-Echterdingen (DE)

(72) Inventors: Alexander Weidler, Portland, OR (US); Shepol Meman, Portland, OR (US)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/035,682

(22) PCT Filed: Oct. 13, 2021

(86) PCT No.: PCT/EP2021/078321

§ 371 (c)(1),
(2) Date: May 5, 2023

(87) PCT Pub. No.: WO2022/096239

PCT Pub. Date: May 12, 2022

(65) Prior Publication Data

US 2023/0406199 A1     Dec. 21, 2023

(30) Foreign Application Priority Data

Nov. 6, 2020    (GB) ...................................... 2017539

(51) Int. Cl.
*B60Q 1/52* (2006.01)
*G06V 20/56* (2022.01)
(52) U.S. Cl.
CPC .............. *B60Q 1/52* (2013.01); *G06V 20/56* (2022.01)

(58) Field of Classification Search
CPC .. B60Q 1/52; B60Q 7/00; G06V 20/56; G09F 7/20; G09F 7/22
See application file for complete search history.

(56) References Cited

U.S. PATENT DOCUMENTS 4,552,089 A  *  11/1985  Mahoney ................ E01F 9/688
                                                          116/63 P
4,802,069 A       1/1989  Chandler
                        (Continued)

FOREIGN PATENT DOCUMENTS

CN        110562133        12/2019
DE        102016015008      6/2017

OTHER PUBLICATIONS

Intellectual Property Office, Search Report under Section 17(5) issued in International Application No. GB2017539.4, Mar. 16, 2021, 3 pp.
                        (Continued)

*Primary Examiner* — Curtis J King
(74) *Attorney, Agent, or Firm* — ArentFox Schiff LLP

(57) ABSTRACT

The invention relates to a safety system (16) for an autonomous vehicle (10), the safety system (16) comprising at least one warning device (26) and a warning system (18). The warning system (18) is configured to automatically detect an emergency situation based on a monitored operating mode of at least one subsystem (44) of the autonomous vehicle (10), and to automatically deploy, in response to detecting the emergency situation, the at least one warning device (26) in a surroundings (28) of the autonomous vehicle (10). The warning system (18) is further configured to deploy the at least one warning device (26) according to a minimal risk procedure (50) of the autonomous vehicle (10).

17 Claims, 4 Drawing Sheets

(56) References Cited

U.S. PATENT DOCUMENTS

| 5,831,521 | A | 11/1998 | Huang | |
| 7,395,776 | B2* | 7/2008 | Harruna | G09F 21/048 |
| | | | | 116/63 P |
| 10,124,757 | B1 | 11/2018 | Kerr | |
| 10,773,643 | B1* | 9/2020 | Patnaik | G07C 5/0816 |
| 2005/0046596 | A1* | 3/2005 | Nelson | G09F 21/04 |
| | | | | 340/908 |
| 2008/0006199 | A1* | 1/2008 | Harruna | G09F 21/04 |
| | | | | 116/28 R |
| 2008/0218329 | A1* | 9/2008 | Fan | B60Q 7/00 |
| | | | | 340/473 |
| 2011/0249430 | A1* | 10/2011 | Stamatatos | F21S 8/032 |
| | | | | 362/184 |
| 2015/0015194 | A1* | 1/2015 | Leabman | H02J 50/27 |
| | | | | 320/108 |
| 2015/0177896 | A1* | 6/2015 | Chun | B60K 35/10 |
| | | | | 345/174 |
| 2015/0310781 | A1 | 10/2015 | Fisher | |
| 2015/0380975 | A1* | 12/2015 | Kanahara | H04L 67/12 |
| | | | | 320/108 |
| 2016/0202077 | A1* | 7/2016 | Huang | G06V 20/58 |
| | | | | 701/540 |
| 2016/0336788 | A1* | 11/2016 | Hyun | H02J 7/0042 |
| 2017/0313241 | A1* | 11/2017 | Wu | G08G 1/0955 |
| 2018/0186283 | A1* | 7/2018 | Fischer | G07C 5/008 |
| 2018/0224909 | A1* | 8/2018 | Koo | H02J 50/10 |
| 2018/0354417 | A1* | 12/2018 | Parissi | B64U 80/86 |
| 2018/0363256 | A1* | 12/2018 | Acosta Rodriguez | B60Q 7/005 |
| 2019/0210436 | A1 | 7/2019 | Frederick | |
| 2019/0220026 | A1* | 7/2019 | Vawter | G05D 1/0274 |
| 2019/0220032 | A1* | 7/2019 | Skorinko | G05D 1/0225 |
| 2019/0294161 | A1* | 9/2019 | Matsumoto | B60W 30/10 |
| 2019/0389373 | A1* | 12/2019 | Erdl | B60Q 1/0035 |
| 2020/0039422 | A1* | 2/2020 | Wornham | G09F 13/22 |
| 2020/0215917 | A1* | 7/2020 | Schöning | B60K 35/29 |
| 2020/0385006 | A1* | 12/2020 | Matsumoto | B60W 40/08 |
| 2021/0031681 | A1* | 2/2021 | Patnaik | B60W 50/0205 |
| 2021/0078599 | A1 | 3/2021 | Yu | |
| 2021/0149410 | A1* | 5/2021 | Chien | G05D 1/0234 |
| 2021/0262180 | A1* | 8/2021 | Lin | E01F 9/629 |
| 2021/0370934 | A1* | 12/2021 | Aderum | B60W 30/12 |
| 2021/0394674 | A1* | 12/2021 | Price | E01F 9/619 |
| 2022/0055535 | A1* | 2/2022 | Chien | B60Q 7/00 |
| 2022/0063804 | A1* | 3/2022 | Kim | G06Q 30/0265 |
| 2023/0039236 | A1* | 2/2023 | Hong | G06Q 10/083 |
| 2024/0034226 | A1* | 2/2024 | Gagliano | G05D 1/0088 |
| 2024/0034233 | A1* | 2/2024 | Gagliano | B60Q 7/00 |
| 2024/0034234 | A1* | 2/2024 | Gagliano | B60Q 7/02 |

OTHER PUBLICATIONS

Patent Cooperation Treaty, International Searching Authority, Notification of Transmittal of the International Search Report and the Written Opinion of the International Searching Authority, or the Declaration, issued in International Application No. PCT/EP2021/078321, Feb. 1, 2022, 13 pp.

Patent Cooperation Treaty, Notification Concerning Transmittal of the International Preliminary Report on Patentability (Chapter I of the Patent Cooperation Treaty) and the Written Opinion of the International Searching Authority, issued in International Application PCT/EP2021/078321, May 8, 2023, 7 pp.

* cited by examiner

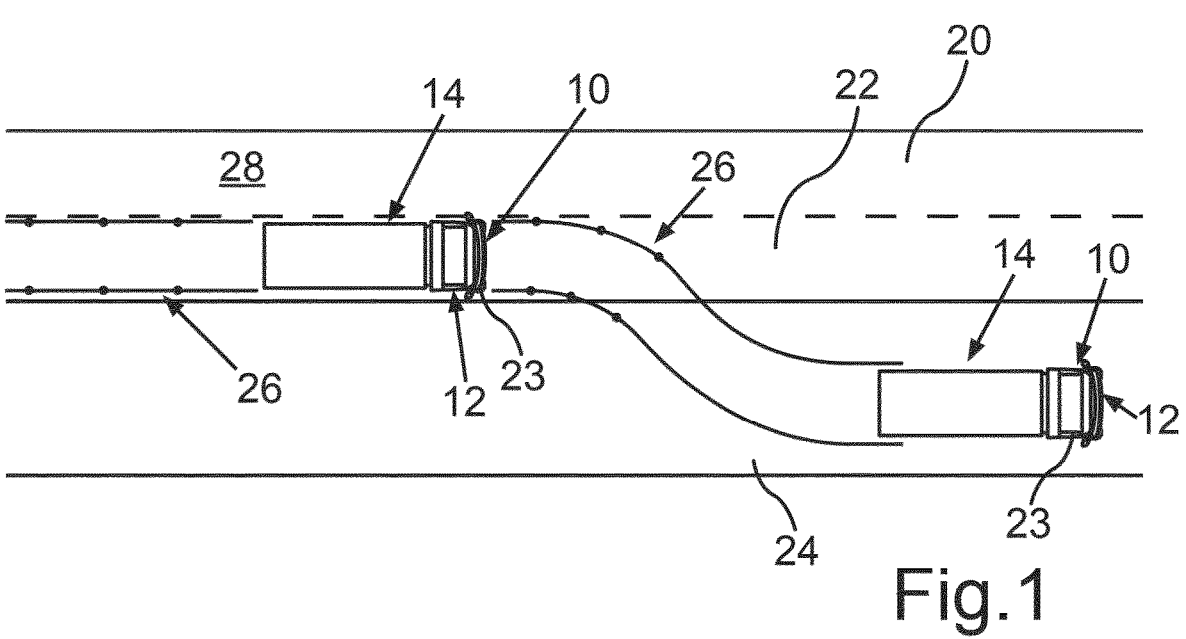
Fig.1
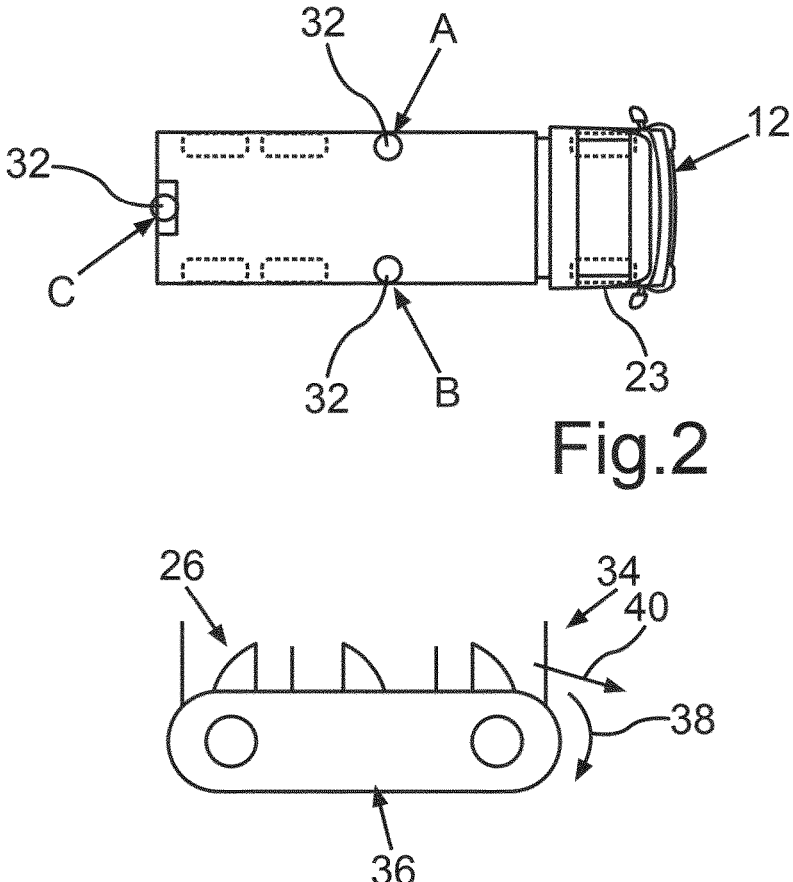
Fig.2
Fig.3

SAFETY SYSTEM FOR AN AUTONOMOUS VEHICLE, AND METHOD FOR OPERATING A SAFETY SYSTEM OF AN AUTONOMOUS VEHICLE

CROSS-REFERENCE TO RELATED APPLICATIONS

This application is a U.S. national phase application filed under 35 U.S.C. § 371 of International Application No. PCT/EP2021/078321, filed Oct. 13, 2021, designating the United States, which claims priority from British patent application No. 2017539.4, filed Nov. 6, 2020, both of which are hereby incorporated by reference herein in their entireties.

FIELD OF THE INVENTION

The invention relates to a safety system for an autonomous vehicle. The invention also relates to a method for operating a safety system of an autonomous vehicle.

BACKGROUND INFORMATION

U.S. Pat. No. 6,650,252 B2 shows a method for warning a second vehicle of a travel condition problem encountered by a first vehicle at a first location.

SUMMARY OF THE INVENTION

It is an object of the present invention to provide a safety system for an autonomous vehicle, and a method such that a particular high safety may be realized.

This object is solved by a safety system having the features of patent claim 1. Advantageous embodiments with expedient developments of the invention are indicated in the other patent claims.

A first aspect of the present invention relates to a safety system for an autonomous vehicle, in particular an autonomous commercial vehicle. Preferably, the autonomous vehicle comprises an electronic computing device configured to drive the vehicle at least partially autonomously or at least partially automatically. The safety system comprises at least one warning device. The safety system further comprises a warning system which may be a part of said electronic computing device. The warning system is configured to automatically detect an emergency situation, in particular of the autonomous vehicle, based on a monitored operating mode of at least one subsystem of the autonomous vehicle. The warning system is also configured to automatically deploy the at least one warning device in a surroundings of the autonomous vehicle in response to detecting the emergency situation according to a minimal risk procedure of the autonomous vehicle. Thereby, other vehicles and/or persons in the surroundings may be warned of the situation and/or other vehicles and/or persons in the surroundings may be made aware of the emergency situation. Thus, a particular high safety may be realized.

A second aspect of the present invention relates to a method for operating a safety system of an autonomous vehicle. Preferably, the safety system of the second aspect of the invention is configured as the safety system according to the first aspect of the invention. In the first step of said method, an emergency situation is automatically detected by a warning system of the safety system. In a second step of the method, at least one warning device of the safety system is automatically deployed by the warning system in a surroundings of the vehicle in response to detecting the emergency situation. Advantages and advantageous embodiments of the first aspect of the present invention are to be regarded as advantages and advantageous embodiments of the second aspect of the present invention and vice versa.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

FIG. 1 shows a schematic top view of an autonomous vehicle comprising a safety system according to the present invention.

FIG. 2 shows a further schematic top view of the autonomous vehicle.

FIG. 3 shows a schematic side view of a conveyer belt of a warning system of the safety system.

In the figures the same elements or elements having the same function are indicated by the same reference signs.

DETAILED DESCRIPTION

Figure 4:
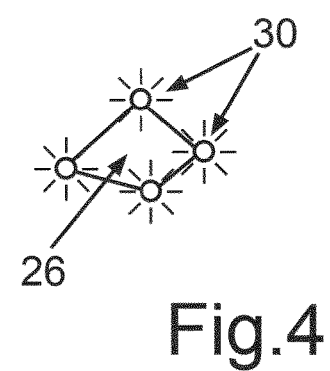
FIG. 4 shows a schematic perspective view of a warning device of the safety system.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawing and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiment of the disclosure, reference is made to the accompanying drawing that forms part hereof, and in which is shown by way of illustration a specific embodiment in which the disclosure may be practiced. This embodiment is described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 5:
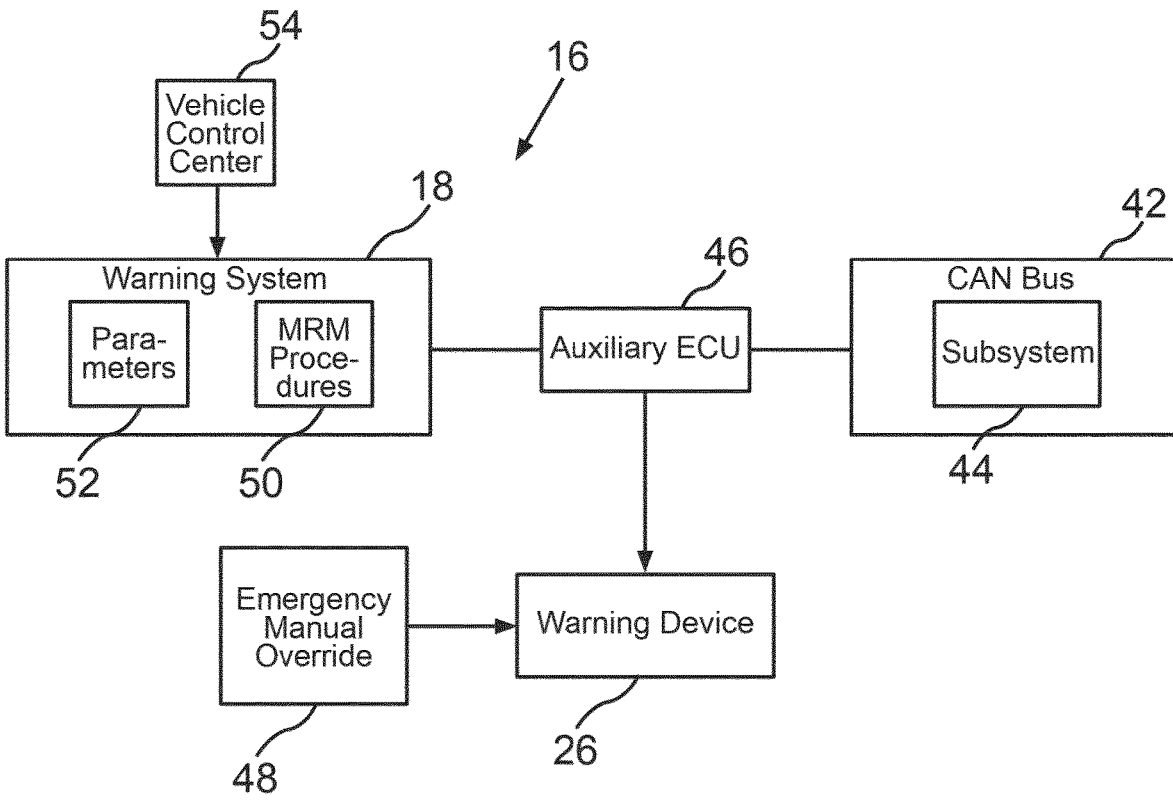
FIG. 5 shows a schematic view of a first embodiment of the safety system.
Figure 6:
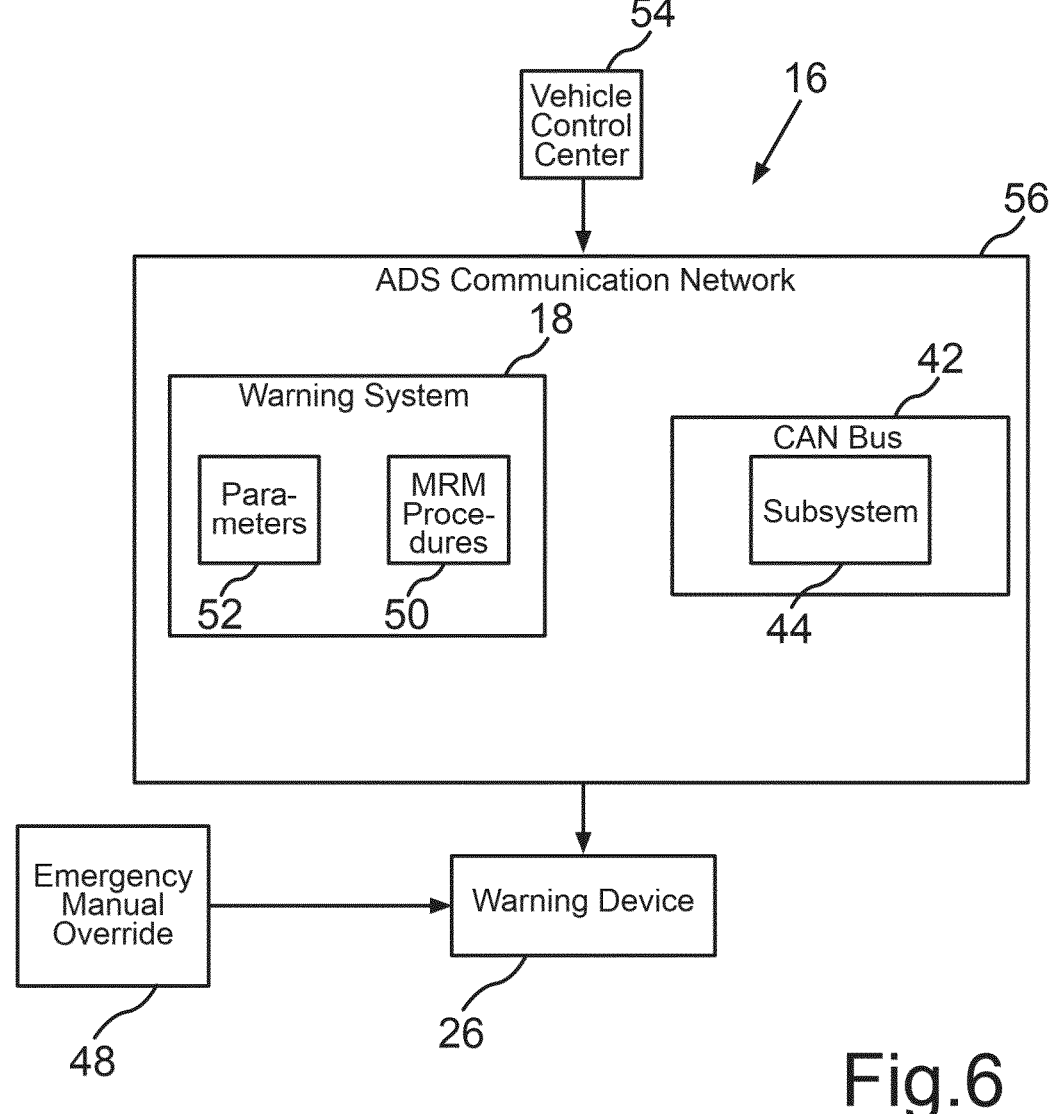
FIG. 6 shows a schematic view of a second embodiment of the safety system.

FIG. 1 shows, in a schematic top view, an autonomous vehicle 10, which, in example shown in FIG. 1, is configured as an autonomous commercial vehicle. In the example shown in FIG. 1, the autonomous vehicle 10 is a truck-trailer combination comprising a tractor truck 12 and a trailer 14 which is articulately coupled with the tractor truck 12. The autonomous vehicle 10, in particular the tractor truck 12, comprises at least one motor configured to drive the vehicle 10. Furthermore, for example, the autonomous vehicle 10, in particular the tractor truck 12, comprises an electronic computing device configured to perform an at least partially automatic and/or autonomous drive of the commercial vehicle 10. As will be explained in greater detail below, the autonomous vehicle 10, in particular the tractor truck 12, comprises a safety system 16 (FIGS. 5 and 6). The safety system 16 comprises a warning system 18 which, for example, may be part of said electronic control unit.

As shown in FIG. 1, initially, the autonomous vehicle 10 is driven at least partially automatically or at least partially autonomously along a road 20 by the electronic computing device. For example, the road 20 is a highway. During this drive, the safety system 16, in particular the warning system 18, automatically detects an emergency situation. For example, said interior is bound by a cab 23 of the tractor truck 12. The cab 23 is also referred to as a driver's cab. For example, in response to detecting the emergency situation, the autonomous vehicle 10 is automatically or autonomously driven from a lane 22 of the road 20 on an emergency lane 24 and stopped on the emergency lane 24. Moreover, warning devices 26 of the safety system 16 are automatically deployed by the warning system 18 in a surroundings 28 of the autonomous vehicle 10 in response to detecting the emergency situation. As shown in FIG. 1, the warning devices 26 are deployed in the surroundings 28 in such a way that warning devices 26 are deployed (i.e. arranged) on the road 20, in particular on the lane 22. Thus, the safety system 16 is an autonomous driving safety system comprising the warning system 18 and the respective warning device 26. For example, the warning device 26 is intended to replace traditional flares that would be deployed by the driver of the vehicle 10 in the event of an emergency situation, for example in the event the vehicle 10 has broken down. By deploying the warning devices 26, nearby or passing by vehicles (i.e. vehicles and/or persons in the surroundings 28) may be warned and/or may be made aware of the emergency situation. Referring to the autonomous vehicle 10 shown in FIG. 1, the warning system 18 is configured to deploy the respective warning device 26 automatically in or during an emergency situation.

In an embodiment, the autonomous vehicle 10 may operate according to a minimal risk maneuver (MRM) procedure 50 (shown in FIGS. 5 and 6) in response to the detection of the emergency situation. For example, the MRM procedure 50 may result in the autonomous vehicle 10 pulling over to the emergency lane 24 in response to the detection of the emergency situation. The warning devices 26, for example, may be stored on either side of the vehicle 10 such that the electronic control unit may control the deployment of the warning devices 26 on either side of the vehicle in accordance with the MRM procedure 50. In the same example, if the vehicle 10 pulls over to the emergency lane 24, it may not be necessary for warning devices 26 to be deployed on the left side of the vehicle during the maneuver (i.e. deployed into lane 22). Therefore, warning devices 26 may only be deployed from the right side of the vehicle 10 into the emergency lane 24. In an embodiment, the MRM procedure 50 may be to first deploy the warning devices 26 from the right side of the vehicle 10, and then from the left side once, for example, the vehicle 10 completes its maneuver into the emergency lane 24.

The warning devices 26 themselves may, for example, comprise hazard indicators such as LED-lit triangles or pyramids that are deployed from the autonomous vehicle 10, in particular from the rear of the autonomous vehicle 10, as the autonomous vehicle 10 is automatically pulled over to the emergency lane 24 due to detecting the emergency situation.

FIG. 4 shows a possible embodiment of the respective warning device 26. In the embodiment shown in FIG. 4, the warning device 26 is configured as a pyramid. In the further embodiment, the warning device 26 may be configured as a triangle. As shown in FIG. 4, the warning device 26 is an illuminated pyramid such that, for example, the warning device 26 may be configured as an illuminated triangle. The warning device 26 may comprise light sources 30 configured to emit light, in particular by using electrical energy. In the embodiment shown in FIG. 4, the light sources 30 may be configured as hazard indicators. The respective warning device 26 may be loaded or pre-loaded in a compartment of the autonomous vehicle 10, in particular the tractor truck 12. In FIG. 2, potential areas A, B and C in which said compartment may be arranged are shown. In FIG. 2, said compartment is indicated by 32. Thus, the respective warning device 26 may be arranged in at least one of said areas A, B and C. It should be appreciated that the warning device 26 shown in FIGS. 3 and 4 is an exemplary embodiment, and that the warning device 26 may be a device of an alternative shape or form that emits a warning light or signal.

As shown in FIG. 3, the warning system 18 may comprise a moving device 34 configured to move the warning device 26 out of the compartment 32 thereby deploying the warning device 26 in the surroundings 28 in response to detecting the emergency situation. According to FIG. 3, the moving device 34 may comprise a conveyer belt 36 which may be arranged in the compartment 32. Moreover, initially, the warning devices 26 are arranged on the conveyer belt 36. As illustrated in FIG. 3 by an arrow 38, the conveyer belt 36 may be moved in a moving direction thereby conveying the warning devices 26 of the conveyer belt 36 and out of the compartment 32 such that warning devices 26 are successively deployed or arranged in the surroundings 28, in particular on the lane 22. In FIG. 3, an arrow 40 illustrates a movement of the respective warning devices 26 on the conveyer belt 36 and out of the compartment 32. For example, the respective warning device 26 may be pre-loaded in the compartment 32.

In a further embodiment, alternatively or additionally, the moving device 34 may comprise at least one spring element which may be configured as a pre-loaded spring. For example, the spring element may be arranged in the compartment 32. For example, the spring element may be a part of a pre-loaded spring mechanism which may be arranged in the compartment 32. Moreover, the compartment 32 may comprise a through opening through which the respective warning device 26 may be moved such that the warning device 26 may be moved out of the compartment 32 via or through the through opening. Moreover, for example, the warning system 18 may comprise a door assigned to the through opening of the compartment 32. The door may be moved, in particular rotated, between at least one open position and a closed position. In the closed position, the door covers the through opening and thus the compartment 32. In the open position, at least a portion of said through opening is uncovered such that the respective warning device 26 may be moved out of the compartment 32 and through the uncovered portion. For example, the conveyer belt 36 and/or said spring element is activated upon opening of the door which is also referred to as a compartment door. By activating the conveyer belt 36 and/or the spring element respectively, the respective warning device 26 is moved out of the compartment 32 thereby deploying the warning device 26.

In an embodiment, the warning system 18 may facilitate an actuation of the warning device 26 (i.e. an activation of the conveyer belt 36 and/or an opening of the compartment door). In another embodiment, the warning device 26 may be wirelessly charged. In other words, for example, the warning device 26 may comprise an energy storage configured to store electrical energy. Thus, for example, the energy storage may be wirelessly charged, in particular whilst the warning device 26 is arranged in the compartment 32.

Alternatively or additionally, the warning device 26 may comprise a back-up battery supply in the event power cannot be provided to the warning device 26 during an emergency situation. For example, the light sources 30 which may be configured as LEDs may be supplied with electric energy stored in said energy storage and/or said battery such that the light sources 30 may emit light by using the electric energy the light sources 30 are supplied with.

In a further embodiment, the respective warning device 26 may be positioned in various areas of the cab 23. For example, said areas of the cab 23 are the areas A, B and C shown in FIG. 2. For example, the warning device 26 may be stored within a baggage compartment, behind fairings on the cab 23, on a cross beam behind an axel or behind a fuel tank. In another embodiment, multiple devices such as multiple warning devices 26 may be placed on the autonomous vehicle 10, in particular on the tractor truck 12, such as on each side (e.g. one warning device 26 behind each fuel tank). In an alternative embodiment, an autonomous truck such as the tractor truck 12 may be integrated with a trailer such as the trailer 14, and the warning device 26 may be stored or arranged in a position on the trailer 14 and may be actuated by the warning system 18.

In an embodiment, the warning system 18 is configured to identify emergency situations by actively monitoring various subsystems 44 (shown in FIGS. 5 and 6) of the autonomous vehicle 10. By monitoring said subsystems 44, the warning system 18 may be able to identify faults and/or modes of operation out of a preset operating range. For example, the following is a list of faults that the warning system 18 may identify in the subsystems 44 which may lead to the actuation (i.e. the deployment) of the warning device 26:

Redundant system failure (braking, steering, powernet)
Virtual driver (autonomous driving main control system) failure, virtual driver loss of perception of environment
Lost communication with sensors
Lost communication with vehicle control center (VCC)
General mechanical failure such as, for example, the following:
tire failure: (given from tire pressure management system (TPMS))
compression loss (given from vehicle diagnostics)
oil pressure loss (given from vehicle diagnostics)
etc.

The warning system 18 may store a set of parameters 52 (shown in FIGS. 5 and 6) that the warning system 18 compares monitored subsystems 44 against in order to identify that at least one of the subsystems 44 comprises a fault or is operating in a mode outside its operating range. For example, the parameters 52 may define a threshold for what a failure of a redundant system (e.g. braking, steering, powernet) of the autonomous vehicle 10 is. In other words, the parameters 52 may define the preset operating range of each subsystem 44. Based on whether the monitored operating mode of at least one subsystem 44 falls within the preset operating range defined by the parameters 52, the warning device 26 may be actuated (i.e. deployed).

FIG. 5 shows in a schematic view a first embodiment of the safety system 16. As shown in FIGS. 5 and 6, in a possible embodiment, the warning system 18 may be able to utilize existing controller area network (CAN) and overall autonomous driving system (ADS) communication in order to monitor the subsystems 44 of the autonomous vehicle 10. In the first embodiment shown in FIG. 5, an overall architecture may include an auxiliary electronic control unit (ECU) 46 that may monitor a CAN bus 42 of the autonomous vehicle 10 in order to detect a fault and/or mode of operation out of the preset operating range. The auxiliary ECU 46 may request actuation (i.e. deployment) of the warning device 26 from the warning system 18 based on the monitored operating states of the vehicle subsystems 44 included within the CAN bus 42.

In another embodiment, the autonomous vehicle 10 may be also configured to be driven manually (i.e. by a human driver in the interior bounded by the cab 23). Alternatively or additionally, the autonomous vehicle 10 may be configured to carry at least one passenger while driving autonomously or automatically. In this embodiment, for example, an emergency manual override switch 48 may be provided that may be engaged by said human driver and/or by said passenger in order to actuate the warning device 26. Thus, the emergency manual override switch 48 may be an operating element arranged in the interior of the autonomous vehicle 10. The operating element may be configured to be operated by a person which may be said driver or passenger. By operating the operating element, the deployment of the warning device 26 in the surroundings 28 is effected manually (i.e. by the driver or the passenger). In another embodiment, a vehicle control center (VCC) 54, or a remote technician may instruct the actuation (i.e. deployment) of the warning device 26 through the ADS communication network.

FIG. 6 shown, in a schematic view, a second embodiment of the safety system 16. In the second embodiment shown in FIG. 6, the warning system 18 may be an integrated system within the ADS communication network 56 and actively monitor the CAN bus 42 in its entirety. Upon detection of a fault or an operating mode outside the preset operation range of at least one of the vehicle subsystems 44 (i.e. upon detecting an emergency situation), the warning system 18 may request actuation of the warning device 26 automatically. The warning system 18 may be an integrated solution within the overall autonomous vehicle architecture and would not require an auxiliary ECU.

In yet a further embodiment, the warning system 18 may be integrated with minimal risk maneuver (MRM) procedures 50 of the autonomous vehicle 10. The warning system 18 may store the MRM procedures 50, and, depending on the maneuver taken by the autonomous vehicle 10 in response to the emergency situation, the warning devices 26 may be deployed in coordination. In an exemplary embodiment, the autonomous vehicle 10 may be in the middle lane of a three-lane highway and a fault occurs and is identified by the warning system 18, thereby detecting an emergency situation. The MRM procedure 50 may be to maneuver the autonomous vehicle 10 to the right lane, or to an available shoulder or breakdown lane such as the emergency lane 24 and come to a stop. In this exemplary embodiment, the warning devices 26 may first be deployed by the warning system 18 from the right side of the autonomous vehicle 10, and after moving to the right lane, breakdown lane or shoulder, the left side of the autonomous vehicle 10 may drop further and/or the remaining warning devices 26. In this method, the warning devices 26 are deployed in a way that is coordinated with the MRM procedure 50 and that may warn nearby vehicles of the disabled autonomous vehicle 10 while causing minimal irritation to traffic (i.e. if the left side dropped warning devices 26 in the beginning of the maneuver, the warning devices 26 would be deployed in the middle of the travelling lane which may affect traffic).

Figure 7:
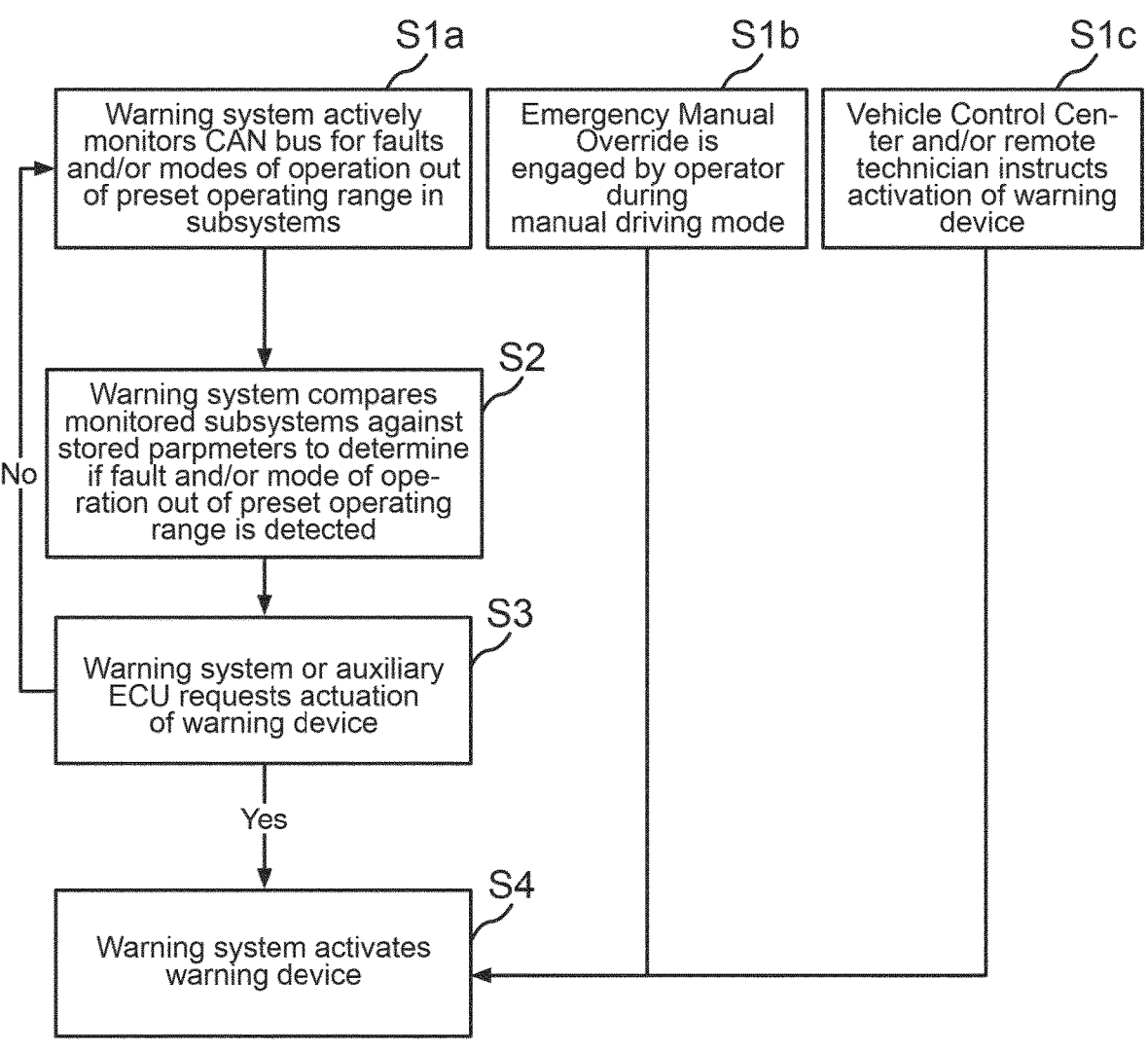
FIG. 7 shows a block diagram for illustrating a method according to the present invention.

FIG. 7 shows a block diagram illustrating a method for operating the safety system 16. Particularly, in the method, the warning system 18 is activated. For example, in a first step S1*a* of the method, the warning system 18 actively monitors the CAN bus for faults and/or modes of operation out of the preset operating range in subsystems 44 of the autonomous vehicle 10. In an embodiment, the operating ranges of the subsystems 44 may be defined by the parameters 52 stored in a memory of the warning system 18. In a second step S2 of the method, the warning system 18 compares the monitored subsystems 44 against the stored parameters 52 to determine if a fault and/or mode of operation outside of the preset operating range is detected. In a third step S3, the warning system 18 automatically requests the actuation of the warning devices 26. In an alternative embodiment, if the architecture comprises said auxiliary ECU 46, the auxiliary ECU 46 requests actuation of the warning device 26 from the warning system 18. If the request is not met due to a threshold of an emergency situation not being met, the warning system 18 will continue to actively monitor the CAN bus 42 (first step S1*a*). If the request is met, then, in a fourth step S4 of the method, the warning devices 26 are activated as defined by the warning system 18 based on the MRM procedures 50. In another embodiment, the warning system 18 may be integrated with the overall ADS communication network 56 such that it is aware of the overall operating state of the autonomous vehicle 10 and is able to coordinate the deployment of the warning devices 26 with the appropriate MRM procedure 50. In an alternative embodiment, an emergency manual override switch 48 may be engaged by a passenger, or a driver during a manual mode of operation, to activate the warning system 18. In an alternative first step S1*b* of the method, the emergency manual override switch 48 is engaged and the warning devices 26 are activated at the fourth step S4 as defined by the warning system 18 based on the MRM procedures 50. In another alternative embodiment, the VCC 54 or remote technician may instruct that the warning devices 26 be activated. In an alternative first step S1*c* of the method, the VCC 54 instructs the activation of the warning devices 26, and the warning devices 26 are activated at the fourth step S4 as defined by the warning system 18 based on the MRM procedures 50.

REFERENCE SIGNS

10 autonomous vehicle
12 tractor truck

14 trailer
16 safety system
18 warning system
20 road
22 lane
23 cab
24 emergency lane
26 warning device
28 surroundings
30 light source
32 compartment
34 moving device
36 conveyor belt
38 arrow
40 arrow
42 CAN bus
44 subsystems
46 auxiliary ECU
48 emergency manual override
50 MRM procedures
52 parameters
54 VCC
56 ADS communication network
S1*a* first step
S1*b* first step
S1*c* first step
S2 second step
S3 third step
S4 fourth step
A, B, C area

The invention claimed is:

1. A safety system for an autonomous vehicle, the safety system comprising:
   at least one warning device configured as a pyramid having a light source configured to emit light to illuminate the at least one warning device;
   a moving device comprising a conveyor belt for separately deploying each of the at least one warning device from the autonomous vehicle; and
   a warning system configured to automatically detect an emergency situation based on a monitored operating mode of at least one subsystem of the autonomous vehicle, and to operate the conveyor belt to automatically separately deploy, in response to detecting the emergency situation, each of the at least one warning device from a respective position on the conveyor belt into a surroundings of the autonomous vehicle;
   wherein the at least one warning device is configured for wireless charging.

2. The safety system according to claim 1, wherein the at least one warning device comprises a plurality of light sources.

3. The safety system according to claim 1, wherein the conveyor belt is arranged inside a compartment of the vehicle.

4. The safety system according to claim 1,
   wherein the safety system comprises at least one operating element arranged in an interior of the vehicle, the at least one operating element being configured to be operated by a person thereby manually effecting deployment of the at least one warning device in the surroundings.

5. The safety system according to claim 1, wherein the safety system comprises a vehicle control center that is configured to deploy the at least one warning device in the surroundings.

6. The safety system according to claim 1,
wherein the safety system is incorporated within an autonomous driving system communication network in order to monitor the at least one subsystem.

7. The safety system according to claim 1,
wherein the safety system comprises an auxiliary electronic control unit that monitors the at least one subsystem and requests actuation of the at least one warning device from the warning system.

8. The safety system according to claim 1, wherein the at least one warning device comprises a first warning device and a second warning device, and further comprising:
a first compartment on a left side of the vehicle relative to a front of the vehicle, wherein the first compartment contains the first warning device; and
a second compartment on a right side of the vehicle relative to the front of the vehicle, wherein the second compartment contains the second warning device;
wherein the warning system is configured to selectively deploy the first warning device to the left side of the vehicle and the second warning device to the right side of the vehicle.

9. A safety system for an autonomous vehicle, comprising:
a compartment;
at least one warning device configured as a pyramid a light source configured to emit light to illuminate the at least one warning device and configured for wireless charging inside the compartment; and
a warning system configured to:
automatically detect an emergency situation based on a monitored operating mode of at least one subsystem of the autonomous vehicle, and
automatically separately deploy, in response to detecting the emergency situation, each of the at least one warning device from the compartment into a surroundings of the autonomous vehicle,
wherein the warning system comprises a moving device including a conveyor belt configured to move each of the at least one warning device from a respective position on the conveyor belt and into the surroundings of the autonomous vehicle.

10. The safety system of claim 9, wherein the moving device comprises a spring element.

11. The safety system of claim 10, wherein the spring element comprises a pre-loaded spring mechanism arranged inside the compartment.

12. The safety system of claim 9, wherein the emergency situation comprises a loss of signal with a vehicle control center.

13. A system for deploying warning devices from an autonomous vehicle, the system comprising:
a plurality of warning devices, wherein at least one of the plurality of warning devices is configured as a pyramid having a light source configured to emit light to illuminate the at least one of the plurality of warning devices and configured for wirelessly charging in a compartment inside the autonomous vehicle; and
a warning system configured to:
automatically detect an emergency situation based on a monitored operating mode of at least one subsystem of the autonomous vehicle, and
automatically deploy, in response to detecting the emergency situation, and using a moving device, the plurality of warning devices from the compartment into a surroundings of the autonomous vehicle, wherein the moving device comprises a conveyor belt configured to separately move each of the plurality of warning devices from a respective position on the conveyor belt and into the surroundings of the autonomous vehicle.

14. The system of claim 13, wherein the moving device is arranged in the compartment of the vehicle and is configured to successively deploy the plurality of warning devices in response to detecting the emergency situation.

15. The system of claim 13, wherein the moving device comprises at least one spring element arranged in the compartment of the vehicle for deploying the plurality of warning devices.

16. The system of claim 13, wherein the emergency situation comprises a loss of signal with a vehicle control center.

17. The system of claim 13, wherein, in connection with detecting the emergency situation, the vehicle is configured to perform a minimal risk maneuver to move the vehicle from a driving lane to an emergency lane, and wherein automatically deploying the plurality of warning devices comprises deploying a first warning device on a first side of the vehicle during the minimal risk maneuver, and deploying a second warning device on a second side of the vehicle once the minimal risk maneuver is completed and the vehicle is stopped.

* * * * *